June 18, 1940.

A. W. TONDREAU 2,204,917

FILM APPARATUS

Filed Feb. 12, 1938

INVENTOR.
ALBERT W. TONDREAU
BY
W E Beatty
ATTORNEY

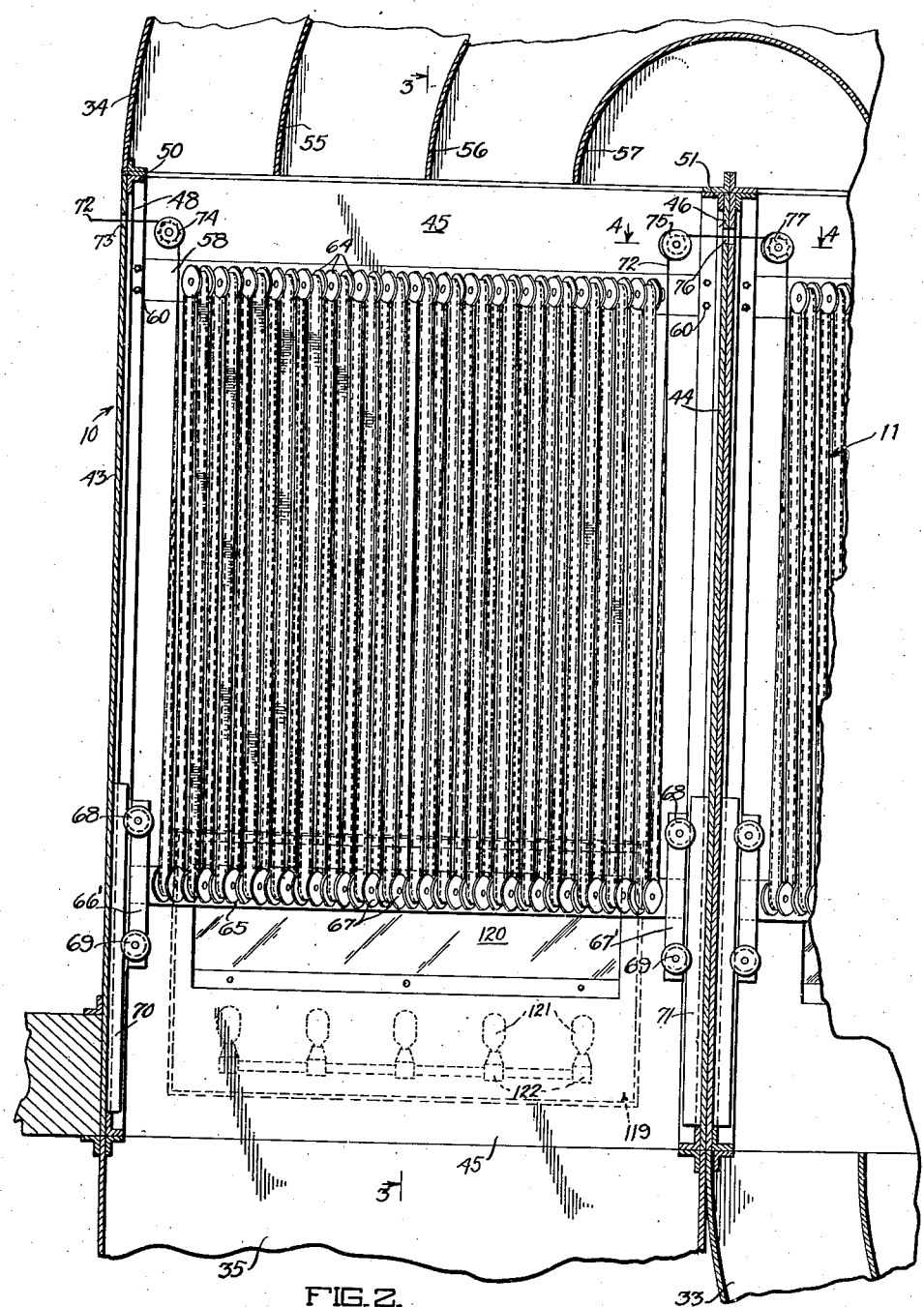

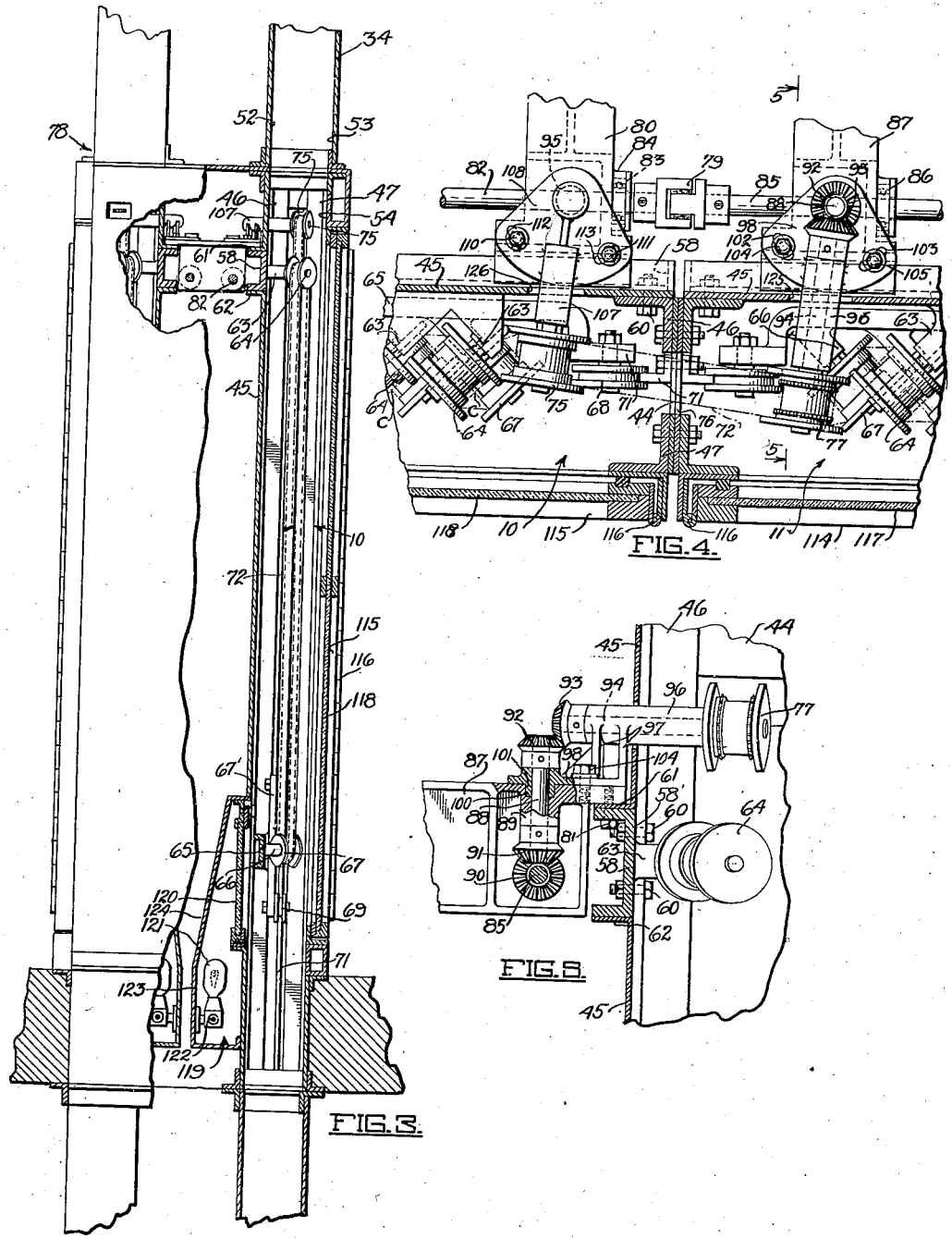

Patented June 18, 1940

2,204,917

UNITED STATES PATENT OFFICE 2,204,917

FILM APPARATUS

Albert W. Tondreau, Glendale, Calif., assignor to Warner Bros. Pictures, Inc., New York, N. Y., a corporation of Delaware Application February 12, 1938, Serial No. 190,237

7 Claims. (Cl. 34—48)

This invention relates to photographic film treating apparatus and has particular reference to apparatus for drying a motion picture film after it passes through various film treating liquids.

In conventional motion picture film drying apparatus the film is passed endwise through a plurality of substantially parallel elongated loops in one or more elongated film drying compartments while a current of drying air is passed through the compartments to remove the moisture adhering to the film. In order to effect compactness of the drying apparatus and to hold a maximum amount of film in each compartment at any one time, the film loops are generally made comparatively long, on the order of six or seven feet in length. Also the various strands of the parallel film loops are run as close together as possible. One factor which limits the closeness of the spacing as well as the length of the various film loops is the flapping or swaying of the various film strands due to the action of the air current thereon, which flapping tends to cause adjacent film strands to engage each other and therefore scratch the emulsion surfaces thereof. This is especially apparent in the early stages of drying wherein the film emusion is very susceptible to scratching due to its soft and sticky nature during that period. It is to be noted that the apparently obvious remedy of stretching or tensioning the film as by introducing a high spreading force between the film guiding means at either end of the various film loops cannot be resorted to due to the relatively low tensile strength of the film, the ease with which the sprocket perforations thereof can be enlarged or torn out completely while the film is being drawn under tension by a film driving sprocket, as well as due to the detrimental stretching effect on the film while it is wet.

One object of the present invention is to reduce the flapping action of the film strands in a plurality of elongated film loops while being dried by a current of air.

A further object of the invention is to improve the facilities for inspecting the film while it is passing through the dry box without interfering with the flow of air through the film drying compartment.

A further object of the invention is to improve the film drive, particularly for a plurality of adjacent film compartments.

A still further object of the invention is to prevent an edge or side thrust of an elongated film while passing over a plurality of spaced spool heads, and/or while passing from one compartment to another.

The manner in which the above and other objects of the invention are accomplished will be readily understood on reference to the accompanying specification read in conjunction with the accompanying drawings wherein:

Fig. 2 is a sectional, elevational view taken longitudinally through one of the drying compartments of the apparatus.

Fig. 3 is a transverse view, partly in section, of a pair of the film compartments, the sectional portion thereof being along the line 3—3 of Fig. 2.

Fig. 4 is a sectional plan view through the film guiding spool and film sprocket assembly for passing the film successively from one compartment to an adjacent compartment, and is taken along the line 4—4 of Fig. 2.

Fig. 5 is a sectional view of the film driving sprocket and its associate mechanism and is taken along the line 5—5 of Fig. 4.

Figure 1:
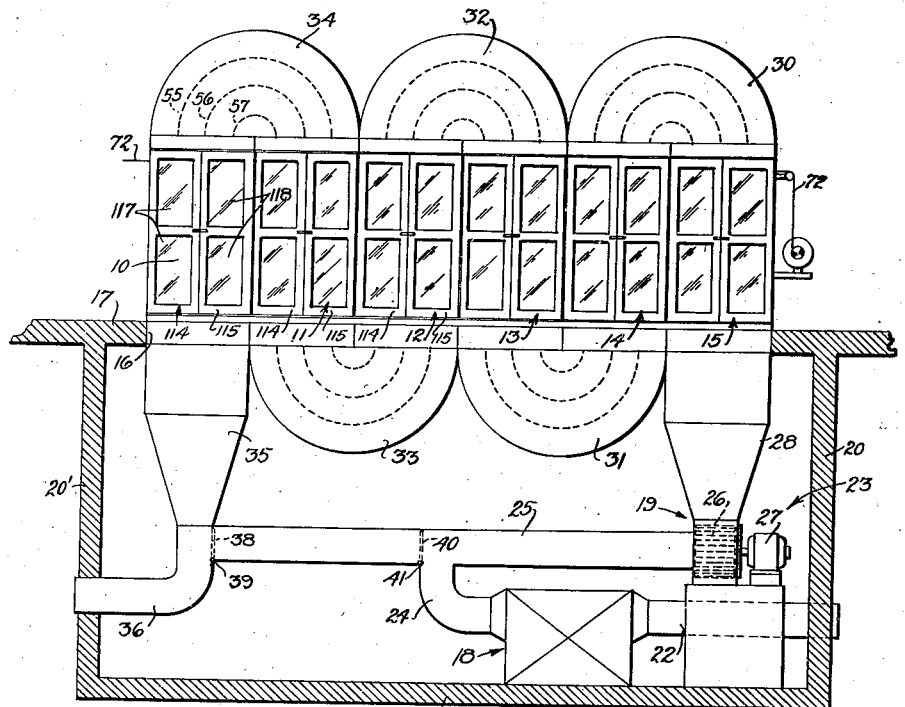
Fig. 1 is a schematic elevational view of a film drying apparatus embodying my invention.

Referring particularly to Fig. 1, the film drying apparatus comprises a row of vertically extending juxtaposed film drying compartments 10, 11, 12, 13, 14 and 15. These compartments are placed end to end and are supported in an opening 16 formed in a supporting floor 17. Conditioned drying air is supplied by an air conditioning unit, generally indicated at 18, and is passed in succession through the various compartments 10 to 15, inclusive, by a blower unit 19. Air conditioning unit 18 may be of conventional construction, means being associated therewith to regulate the temperature and humidity of the air passed therethrough to suit the drying requirements of the various compartments. The unit 18 is supported on a lower floor 21 and has the inlet conduit 22 thereof opening exteriorly of the room 23 formed in part by the upper and lower floors 17 and 21 and by walls 20 and 20'. The outlet conduit 24 of the air conditioning unit 18 opens upwardly into a longitudinally extending conduit 25. Conduit 25, at one end thereof, opens into the inlet of blower unit 19 which is shown diagrammatically as comprising a centrifugal blower 26 driven by an electric motor 27. The blower 26 exhausts the air drawn through the conduit 25 upwardly through a vertically extending rectangular duct 28 communicating with the lower opening of the drying compartment 15.

A semicircular duct 30 communicates the upper opening of the compartment 15 with the upper opening of the next adjacent compartment 14 to convey the air passing upwardly through the compartment 15 successively down through the compartment 14. A lower semi-circular duct 31 similar to that of 30, extends across the lower openings of the adjacent compartments 13, and 14 to direct the air up through the compartment 13 after passing through the compartment 14. Upper and lower ducts 32, 33 and 34 similar to those at 30 and 31 extend across the upper and lower openings of the compartments 10 to 13, inclusive, to successively pass the conditioned drying air through these various compartments. The air on being passed through the compartment 10 is exhausted through a vertically extending duct 35 opening into an exhaust conduit 36 communicating with the exterior of the room 23.

The longitudinally extending conduit 25 opens at the end thereof opposite the blower unit 19 into the conduit 36 and is adapted to be closed by a swinging valve diagrammatically indicated at 38 and pivoted at 39. Valve 38 may be swung through an arc of 90° to close the exhaust conduit 36 and communicate the exhaust duct 35 with the conduit 25. A valve 40, similar to that of 39, is provided at the juncture of the conduits 24 and 25 and is pivoted at 41 to permit the conduit 24 to be closed.

By moving each of the valves 38 and 40 through an angle of 90° from the position illustrated by the dotted lines in Fig. 1 so as to close the conduits 36 and 24 respectively, the air forced through the various drying compartments by the blower unit 19 may be re-circulated through the closed circuit thus formed, if desired. Also, the valves 38 and 40 may be adjusted in any midway positions so as to permit bi-passing or re-circulating of part of the conditioned air while adding thereto and exhausting therefrom measured portions of air.

Referring now to Figs. 2 and 3, the compartment 10 is illustrated in detail and comprises vertically extending end walls 43 and 44, and a back wall 45. Vertically extending structural angle members as at 46, 47 and 48 forming corner posts are mounted in each corner of the compartment 10 to support the end and back walls 43, 44 and 45, respectively. Transversely extending angle members 50 and 51 are provided across the upper ends of the compartment end walls 43 and 44 to form a means for securing the semicircular duct 34 to the upper end of compartment 10.

It will be noted in Fig. 3 that the sides 52 and 53 of the semi-circular duct 32 are substantially flush with the back and front walls 45 and 54, respectively, of the compartment 10, thus forming a smooth passage at least in a transversely extending direction. Transversely extending semi-circular vanes 55, 56 and 57, concentric with the outer shell of the duct 34, are mounted in this duct to guide a current of air in a semicircular path from the compartment 11 to the compartment 10 in a uniform cross sectional movement, thus preventing bouncing of the air from one wall to another as it passes from one compartment to the other. That is, a uniform velocity is maintained throughout the entire cross-sectional area of the air current passing downwardly from the exit opening of the duct 32. Similar vanes are provided in the other semi-circular ducts 30 to 33, inclusive.

An upper spool head or bar in the form of a horizontally extending channel member 58 is secured between the rear angle members 46 and 48 by bolts 60. The forward or inner face 58' of the channel 58 lies flush with the rear wall 45 to form a smooth passage for the air current passing through the compartment 10. As shown in detail in Fig. 5, the ends 61 and 62 of the wall 45 adjacent the channel 58 are bent inwardly forming flanges which fit against the upper and lower legs of the channel 58 and are suitably secured thereto.

Referring now to Figs. 4 and 5 in particular, spaced projections 63 formed on the channel member 58 extend into the compartment 10. Each of the projections 63 rotatably supports a film guiding spool 64 with the axis thereof extending at an angle of 45° to the length of the channel member 58. The adjacent overlapping end faces of the various spools 64 are spaced apart sufficiently to allow threading of the film on these various spools by sliding the film transversely therebetween. This obviates the necessity of passing the leading end of the film between the surface of the spool over which it is being threaded and the edge of the next succeeding spool supporting projection 63.

A lower spool head is provided, comprising a horizontally extending channel member 65 (Figs. 2 and 3). A plurality of horizontally spaced projections 66 extending inwardly from the member 65 rotatably support a plurality of film spools 67. The axes of spools 67 are arranged in a common horizontal plane, all being parallel with each other, and arranged at an angle of 45° to the length of the member 65, and at 90° to the axes of the upper film spools 64. The channel member 65 has a pair of cross heads 66' and 67' formed at either end thereof. Grooved rollers 68 and 69 are rotatably mounted at either end of each of the cross heads 66 and 67, these rollers being guided vertically along respective vertical guide rails 70 and 71 suitably secured to the end walls 43 and 44, respectively, of the compartment 10. This arrangement permits the various spools 67 carried by the channel member 65 to be reciprocated vertically permitting the length of film in the compartment to be varied as desired and to compensate for shrinkage of the film as it is dried.

It will be noted that the size and spacing of the various upper and lower film spools 64 and 67, respectively, are such that the path of the film 72 as it passes from a lower spool 67 to an upper spool 64 (Fig. 4) is at right angles to the axis of rotation of both of those film spools. The same is true of the film path between all sets of upper and lower spools. That is, the film as it passes from the center of the periphery of the take-off side of a lower spool 67 to the center of the periphery of the take-on side of the next upper spool 64 passes in a vertical direction and although it twists about an angle of 90° during its travel, the right angle relation above described results in the center of the periphery "C" (Fig. 4) of each upper spool 64 being directly in line with the corresponding center of the periphery of the aligned lower spool 67. Thus the film as it passes in a series of sinuous loops is restrained from side thrust while passing over the various spools.

The above described angular arrangement of film guiding spools is disclosed and claimed in the co-pending patent application of A. W. Munson, filed July 28, 1936, Serial No. 93,042.

It will be noted on reference to Fig. 3 that a second row of film compartments, generally indicated at 78, is situated closely adjacent and parallel to the above described row of film compartments, and is of identical construction but placed in a back to back relation to the row of compartments 10 to 15, inclusive. This second row 78 is supplied with conditioned drying air by a conduit and blower system not shown but similar to that shown in Fig. 1. However, the same air conditioning unit 18 of Fig. 1 may be employed, using a common outlet manifold (not shown) in lieu of the outlet conduit 24 to supply conditioned air to both the conduit 25 for the row of compartments 10 to 15, inclusive, and a similar conduit for the row 78 from the unit 18.

It will be noted in Fig. 2 that the film 72, on entering the compartment 10 from the various film treating solutions (not shown) which leave the film in a wet condition, passes through an opening 73 and is drawn over a film drive sprocket 74 extending into the compartment 10 and having its axis at right angles to the average path of the film through the compartment. Film 72 on leaving the compartment 10 passes over a freely rotatable transfer or guide spool 75, through an opening 76 in the adjacent end walls of the compartments 10 and 11, and is thence drawn by means of a film transfer spool or sprocket 77 into the compartment 11.

The drive for the sprocket 77 as well as the support for both the sprocket 77 and spool 75 is shown in detail in Figs. 4 and 5. A horizontally extending support or bracket 80 is secured at one end thereof on top of the channel member 58 adjacent the right hand end of compartment 10 by volts, one of which is shown at 81. The other end of the support 80 (not shown) is supported on a similar channel member provided in an opposite parallel film compartment. A longitudinally extending drive shaft 82, exteriorly of the compartment 10, is mounted in a ball bearing, indicated by the dotted lines 83 carried in a bearing housing 84 formed on the support 80. Shaft 82 is coupled by means of a flexible coupling 79 to a co-extensive drive shaft 85 rotatably mounted at the left hand end thereof in a bearing 86 carried by a support 87, similar to that of 80. A similar support and bearing are provided at each end of each of the compartments 10 to 15, inclusive, to rotatably support coextensive shaft sections similar to those of 82 and 85, each extending the length of its respective compartment.

As shown in Fig. 5 a vertically extending stub shaft 88 is rotatably mounted in a bearing 89 integrally formed in the support 87. The axis of the shaft 88 intersects the axis of shaft section 85 at right angles thereto and is rotatably connected thereto by means of a pair of bevel gears 90 and 91 secured to the shafts 85 and 88, respectively. A bevel gear 92 secured at the upper end of stub shaft 88 meshes with a mating bevel gear 93 secured at the end of a sprocket shaft 94 extending horizontally at right angles to the shaft 88. Shaft 94 carries at the opposite end thereof the film sprocket 77 and is rotatably journalled within a bearing 96 supported by brackets 97 from a sector shaped plate 98. Bearing 96 extends through an enlarged aperture 125 formed in the wall 45. Plate 98 is slidable on the upper surface of the support 87 and has a depending circular bearing sleeve 100, co-axial with the shaft 88 and rotatably received within a socket 101 formed in the upper surface of the support 87. A pair of elongated arcuate slots 102 and 103 are formed in the plate 98 extending concentric with the boss 100. Bolts 104 and 105 extend through slots 102 and 103, respectively, and are threaded in the support 87 to lock the plate 98 in different angular positions. Thus it will be seen that the position of the film sprocket 77 may be shifted about the axis of the shaft 88. This may be done either while the apparatus is in operation or stationary.

The spool 75 for guiding the film 72 onto the sprocket 77 is supported in a manner similar to that of the sprocket 77. A bearing support member 107 extending through an enlarged aperture 126 in wall 45 is provided to rotatably support the shaft (not shown) of the spool 75. Member 107 is supported through suitable brackets upon a sector plate member 108 pivotally mounted, in a manner similar to that shown in Fig. 5, to the support 80 for movement about an axis intersecting the axis of the shaft section 82 at right angles thereto. That is a bearing boss, indicated by the dotted lines 95, depends from the plate 108 and is mounted in a corresponding socket formed in the bracket 80. Clamp screws 110 and 111 extending through arcuate slots 112 and 113, respectively, concentric with the bearing 95, are threaded in the support 80 to clamp the plate 108 and consequently the spool 75 in different angular positions.

After the various film compartments 10, 11 etc. are aligned in substantially their proper relative positions the respective clamp screws for the plates 98 and 108 are loosened to permit the spool 75 in sprocket 77 to be adjusted in proper position relative to each other and to the corresponding lower spools from and to which the film passes before and after travelling over the spool 75 and sprocket 77. These clamp screws are then permanently locked. This provision permits an accurate parallel alignment of the spool 75 and sprocket 77 with each other even though the compartments 10 and 11 may be slightly misaligned with each other, thus preventing a side thrust from being exerted by the film against the edge flanges of the spools and sprocket 75 and 77, respectively.

As shown in Figs. 1, 3 and 4 a pair of doors 114 and 115 cover the front of each of the film compartments 10 to 15, inclusive. These doors open at their adjacent ends to permit threading, inspection or repair of the film in the compartments and are vertically hinged as at 116 to either end of each compartment. Windows 117 and 118 are provided in the doors 114 and 115, respectively, to permit inspection of the film traveling through the respective compartment.

A film illuminating compartment generally indicated at 119 (Figs. 2 and 3) is provided adjacent the lower end of each film compartment to illuminate the film passing through the compartment as well as the interior of the compartment itself. Compartment 18 is substantially rectangular in shape, one wall thereof being formed in part by the wall 45 of the film compartment. A translucent or frosted glass window pane 120 is situated adjacent the top of the compartment 119 and forms the remainder of the wall intermediate the compartments 10 and 119. A plurality of spaced illuminating lamps 121 are mounted in sockets 122 suitably supported from the rear wall 123 of the compartment 119. Lamps 121 are situated below the lower edge of the pane 120. The upper portion of wall 123 slopes inwardly at 124 toward the top thereof to form a reflector to reflect the light from lamps 121 onto the surface of the ground glass pane 120 and thus uniformly illuminate the entire area thereof.

When the drying apparatus is in operation an operator on viewing the film illuminated by the light from lamps 121 passing through the translucent pane 120, may determine whether or not the film is being thoroughly dried during its passage through the various compartments. If more or less drying is required the temperature or humidity of the conditioned drying air may be regulated as desired. Also, the speed of the film may be varied to produce a greater or less drying effect on it for a given degree of temperature and humidity of the drying air.

The position of the window 120 of compartment 119 substantially flush with the inner surface of the wall 45 of compartment 10, assists in forming a smooth, unbroken air passage throughout the length of the compartment 10. A further factor in producing a smooth passageway through compartment 10 is the provision of the upper spool head or bar 58 with the inner face thereof co-extensive with the inner surface of the wall 45. With this construction it will be seen that there are no large obstructions or recesses in the compartment 10 to deflect or obstruct the passage of drying air through the compartment 10 and thus cross currents which would result in flapping or swaying of the various strands of the loops of film passing through the compartment.

While the film driving apparatus above described has been illustrated in connection with the dry end of film processing, it may be used in the wet end, or in a storage elevator, or the like.

I claim:

1. Film treating apparatus comprising a compartment having walls, an inspection window in one wall of said compartment, a translucent pane in an opposite wall of said compartment, means on the exterior of said compartment and on the side thereof adjacent said pane for illuminating said pane, means for passing a film treating fluid through said compartment, means comprising a lower spool head for passing a film through said compartment behind said window and within the illumination of said pane, and guide rails in said compartment for supporting said lower spool head for vertical movement across the front of said pane.

2. Means for driving a film through a current of drying air in a drying compartment while illuminating the film for inspection purposes without thereby substantially producing eddy currents in the drying air comprising the combination of a film drying compartment having a transparent front wall and a back wall, an upper spool head flush with said back wall, a lamp compartment having a window substantially flush with said back wall, a lower spool head in front of said back wall, and means supporting said lower spool head for vertical movement across said window.

3. A film drying apparatus comprising a film compartment having walls, a spool head in said compartment, means for fixedly supporting said spool head with the side thereof facing the interior of said compartment in the plane of the inner face of one of said walls, a plurality of film guiding spools, means extending into said compartment from said spool head for rotatably supporting said spools, means cooperating with said spools for supporting the film in a plurality of loops, and means for passing a current of air longitudinally through said compartment.

4. A film drying compartment according to claim 3 comprising a drive shaft bearing member supported by said spool head, a drive shaft rotatably supported by said member, a horizontal sprocket shaft rotatably supported by said member, and a vertical stub shaft rotatably carried by said member, and geared to said drive shaft and said sprocket shaft.

5. A film drying compartment having wall sections spaced apart vertically in a plane, a horizontal spool head in the space between said sections and secured thereto and having the inner face thereof in said plane, means cooperating with said spool head for supporting the film in loops, and means whereby to direct film drying fluid through said compartment.

6. Apparatus for guiding an elongated film in a predetermined path comprising upper and lower spool heads adapted to guide a film therearound in a plurality of loops through said path, a transfer spool, means for rotatably supporting said transfer spool with the axis thereof in a fixed angular relation to said path, a second transfer spool, means for rotatably supporting said second transfer spool, means whereby the axes of said transfer spools may be angularly adjusted in a substantially horizontal plane relative to said path to guide said film without side thrust, and means for driving said second transfer spool to drive the film.

7. Apparatus for guiding an elongated photographic film comprising a plurality of juxtaposed film compartments, means for guiding the film through each of said compartments, a film driving spool for driving the film from said film guiding means in one compartment to said film guiding means in an adjacent compartment, means for rotatably supporting said spool, means whereby the axis of said spool may be angularly adjusted in a horizontal plane to guide said film therebetween without side thrust, and means for driving said spool.

ALBERT W. TONDREAU.